US005638709A

United States Patent [19]

Clavin

[11] Patent Number: 5,638,709

[45] Date of Patent: Jun. 17, 1997

[54] TRIGGER LATCH

[76] Inventor: Timothy J. Clavin, 13087 Broken Bit Cir., Corona, Calif. 91719

[21] Appl. No.: 571,036

[22] Filed: Dec. 12, 1995

Related U.S. Application Data

[63] Continuation of Ser. No. 232,663, Apr. 25, 1994, abandoned.

[51] Int. Cl.[6] ...... B60R 25/02

[52] U.S. Cl. ...... 70/208; 70/DIG. 31; 292/DIG. 31; 292/229

[58] Field of Search ...... 70/208, DIG. 31; 292/DIG. 31, DIG. 49, 53, 60, 113, 200–210, 229, 247, 107, 108

[56] References Cited

U.S. PATENT DOCUMENTS

| | | | |
|---|---|---|---|
| 1,487,496 | 3/1924 | Wentworth | 70/DIG. 31 X |
| 2,337,531 | 12/1943 | Stockton | 292/229 |
| 2,424,962 | 8/1947 | Best | 292/229 |
| 2,461,393 | 2/1949 | Paxton | 292/229 |
| 2,476,268 | 7/1949 | Beck et al. | 292/229 |
| 2,639,178 | 5/1953 | Hogan | 292/229 |
| 2,717,796 | 9/1955 | Cudney | 292/229 |
| 2,722,445 | 11/1955 | Cudney | 292/229 |
| 2,927,812 | 3/1960 | Smith et al. | 292/196 |
| 3,026,133 | 3/1962 | Swanson | 292/113 |
| 3,030,137 | 4/1962 | Cheney | 292/113 |
| 3,034,817 | 5/1962 | Willis | 292/113 |
| 3,047,321 | 7/1962 | Gander | 292/223 |
| 3,080,743 | 3/1963 | Stansberry | 70/208 |
| 3,209,563 | 10/1965 | Pelcin | 70/146 |
| 3,237,978 | 3/1966 | Swanson | 292/113 |
| 3,250,558 | 5/1966 | McClintock | 292/DIG. 31 X |
| 3,259,412 | 7/1966 | Wheeler | 292/113 |
| 3,283,549 | 11/1966 | Mees | 70/208 X |
| 3,542,410 | 11/1970 | Poe | 292/113 |
| 3,576,118 | 4/1971 | Doerrfeld | 70/208 X |
| 3,998,481 | 12/1976 | Anthone | 292/113 X |
| 4,025,094 | 5/1977 | Mitchell | 292/DIG. 60 X |
| 4,114,424 | 9/1978 | Johnson | 73/40 |
| 4,134,281 | 1/1979 | Pelcin | 70/208 |
| 4,138,869 | 2/1979 | Pelcin | 292/DIG. 31 X |
| 4,159,137 | 6/1979 | Richter | 292/DIG. 49 X |
| 4,170,119 | 10/1979 | Kalis, Jr. | 70/DIG. 31 X |

(List continued on next page.)

FOREIGN PATENT DOCUMENTS

| | | | |
|---|---|---|---|
| 0259108 | 9/1988 | European Pat. Off. | |
| 1266663 | 4/1968 | Germany | 70/208 |
| 2189539 | 10/1987 | United Kingdom | |

OTHER PUBLICATIONS

SOUTHCO, INC. — Adjustable Lever Latch with Keylock, 1986.

SOUTHCO, INC. — A Touch of Chrome, 1990.

SOUTHCO, INC. — Sealed–Lever Latch, 1992.

EBERHARD MFG. CO. — Low Profile, Adjustable Push––Button Trigger Latch, 1985.

VONWEISE — Machine Design, Jul. 9, 1993 p. 115.

EBERHARD MFG. CO. — Low Profile Adjustable Push––Button Trigger Latch, 1985.

HARTWELL — Latches, Hinges, Nylatch, 1992, cover and pages 1,2,3.

SOUTHCO, INC. — Fasteners File, 1990, pp. E–26 —E–32.

SOUTHCO, INC. — Fasteners File, – pp. F–2, F–3.

*Primary Examiner*—Suzanne Dino
*Attorney, Agent, or Firm*—Pretty, Schroeder & Poplawski

[57] ABSTRACT

A trigger latch for mounting in an opening in a door for releasably latching the door to a door frame and having a housing, a handle, a bolt, and a shaft rotatably mounted in the housing and non-rotatably mounted in the handle and in the bolt for rotation of the bolt by the handle between a latch closed position and a latch open position. The shaft preferably comprises first and second drive bushings, each having a circular section rotatably mounted in the housing, a first non-circular section fixedly mounted in the handle, and a second non-circular section fixedly mounted in the bolt, with the first drive bushing have a pin projecting from the inner end and the second drive bushing having a passage therethrough for receiving the pin and joining the bushings together.

6 Claims, 3 Drawing Sheets

U.S. PATENT DOCUMENTS

| | | | |
|---|---|---|---|
| 4,268,072 | 5/1981 | Bohleen et al. | 292/DIG. 31 X |
| 4,307,905 | 12/1981 | Poe et al. | 292/200 |
| 4,309,884 | 1/1982 | Davis | 292/DIG. 31 X |
| 4,318,557 | 3/1982 | Bourne et al. | 292/113 |
| 4,365,831 | 12/1982 | Bourne | 292/229 |
| 4,372,591 | 2/1983 | Cook et al. | 292/221 |
| 4,420,954 | 12/1983 | Hieronymi et al. | 70/208 X |
| 4,487,440 | 12/1984 | Beijer | 292/DIG. 31 X |
| 4,510,779 | 4/1985 | Ahad | 70/208 |
| 4,602,812 | 7/1986 | Bourne | 292/113 |
| 4,638,649 | 1/1987 | Chao | 292/DIG. 31 X |
| 4,693,503 | 9/1987 | Bisbing | 292/210 |
| 4,743,052 | 5/1988 | Stammreich et al. | 292/113 |
| 4,778,207 | 10/1988 | Gergoe | 292/DIG. 31 X |
| 4,826,221 | 5/1989 | Harmon | 292/167 |
| 4,828,299 | 5/1989 | Poe | 292/DIG. 31 X |
| 4,877,274 | 10/1989 | Poe | 292/113 |
| 4,880,261 | 11/1989 | Bisbing | 292/DIG. 31 X |
| 4,925,221 | 5/1990 | Carmody et al. | 292/200 |
| 4,991,885 | 2/1991 | Poe | 292/113 |
| 5,064,228 | 11/1991 | Bisbing | 292/DIG. 31 X |
| 5,201,557 | 4/1993 | Schlack | 292/DIG. 31 X |
| 5,267,762 | 12/1993 | Gromotka | 292/229 |
| 5,321,962 | 6/1994 | Ferchau et al. | 70/208 |
| 5,413,391 | 5/1995 | Clavin et al. | 292/170 |

FIG. 5A
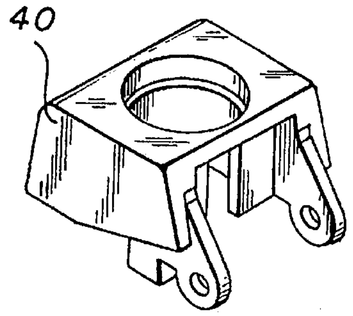
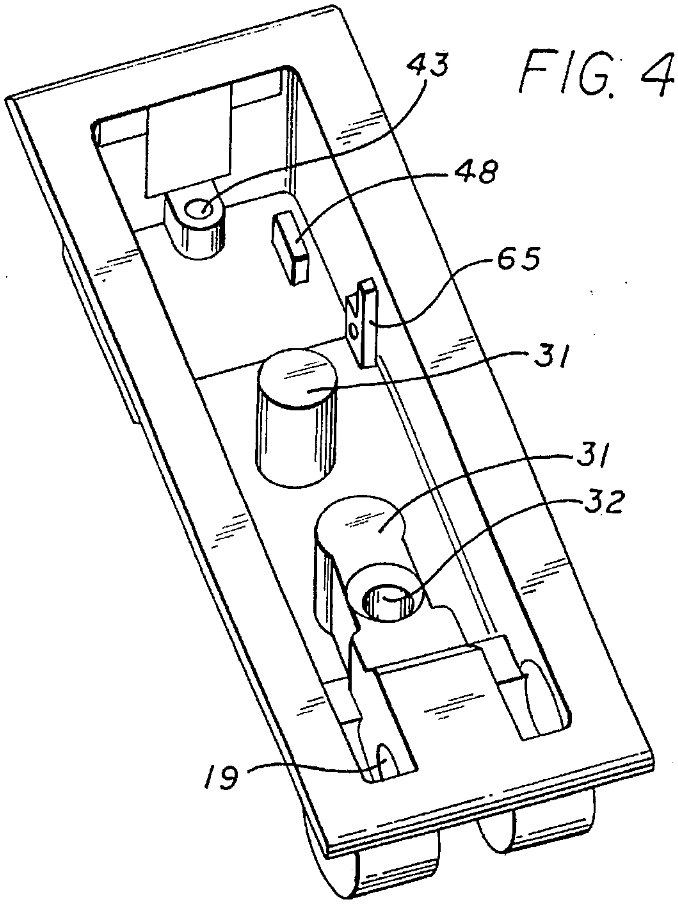
FIG. 4
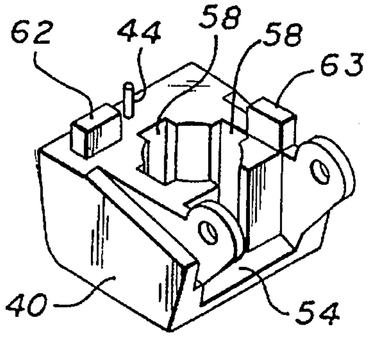
FIG. 5B
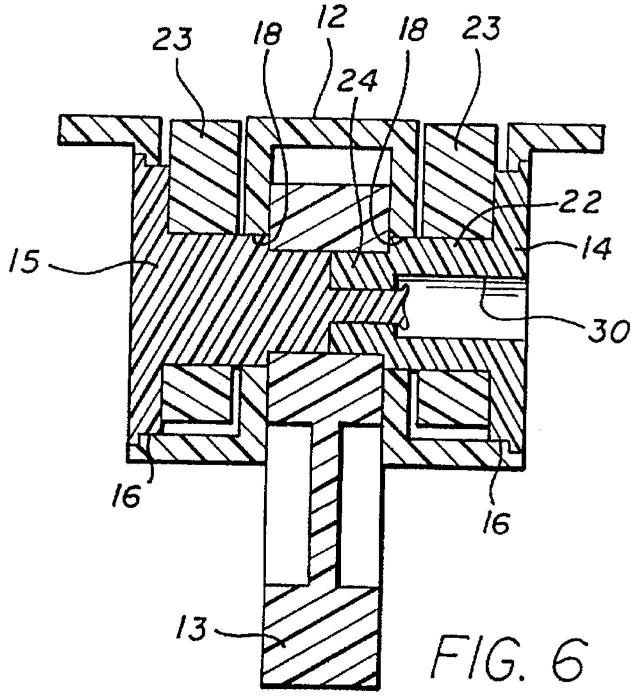
FIG. 6
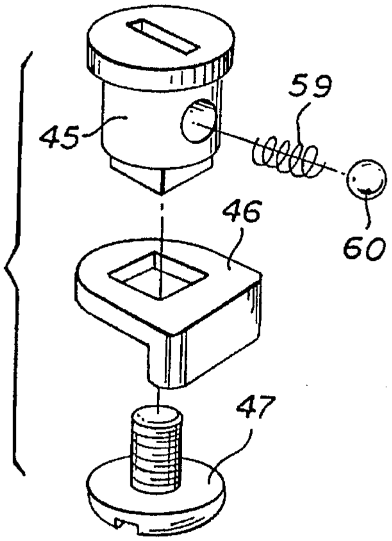
FIG. 7

TRIGGER LATCH

This application is a continuation of application Ser. No. 08/232,653 filed 25 Apr. 1994, now abandoned.

BACKGROUND OF THE INVENTION

This invention relates to latches which may incorporate a trigger for the unlatching operation. The trigger can be lockable, as by a key operated tumbler locking mechanism or a tool actuated lock cylinder. Latches of this general style are in use today.

It is desirable to have the latch mountable in a single rectangular opening in the door while protecting the interior of the latched container from the environment. It is also desirable to provide a lock version and a no-lock version having the same external configuration and utilizing the same mounting opening.

It is an object of the present invention to provide a latch with a new and improved housing seal construction for the rotating shaft which carries the handle and the bolt. It is another object of the invention to provide a latch having a trigger construction which can utilize a lock or omit the lock in the same otherwise identical configuration. Another object of the invention is to provide a locking construction in which a key lock and a tool lock can be used interchangeably.

Other objects, advantages, features and results will more fully appear in the course of the following description.

SUMMARY OF THE INVENTION

A trigger latch for mounting in an opening in a door for releasably latching the door to a door frame, and including a housing, a handle, a bolt, and shaft means rotatably mounted in the housing and non-rotatably mounted in the handle and in the bolt for rotation of the bolt by the handle between a latch closed position and a latch open position. The shaft means preferably comprises first and second drive bushings, each having at least one circular section rotatably mounted in the housing, a first non-circular section fixedly mounted in the handle, and a second non-circular section fixedly mounted in the bolt, with each of the drive bushings having an inner end and an outer end with the inner ends in abutment, and with the first drive bushing have a pin projecting from the inner end and the second drive bushing having a passage therethrough for receiving the pin and joining the bushings together. The pin preferably is formed integrally with the first drive bushing.

The trigger latch preferably also includes a trigger pivotally mounted in the housing for movement between a handle locking position and a handle unlocking position, the trigger and the housing having interengaging means for maintaining the handle in the latch closed position when the trigger is in the handle locking position, a spring positioned between the trigger and the housing for urging the trigger into engagement with the handle in the handle locking position, and a lock carried in the trigger and having a rotatable core moveable between a locked condition and an unlocked condition, the housing and the lock core having interengageable members which are engaged when the lock is in the locked condition preventing pivoting of the trigger away from the handle. The interengageable members preferably comprise a stop in the housing projecting upward toward the trigger and a cam carried on the lock core for abutment with the stop when the lock is in the locked condition.

BRIEF DESCRIPTION OF THE DRAWINGS

FIG. 4 is a perspective view of the housing of the latch;

FIG. 5A is a perspective view of the trigger of the latch, viewed from above;

FIG. 5B is a view similar to that of FIG. 5A, viewed from below;

FIG. 6 is an enlarged sectional view taken along the line 6—6 of FIG. 1, and

FIG. 7 is an exploded view showing a tool actuated lock.

DESCRIPTION OF THE PREFERRED EMBODIMENT

Figure 2:
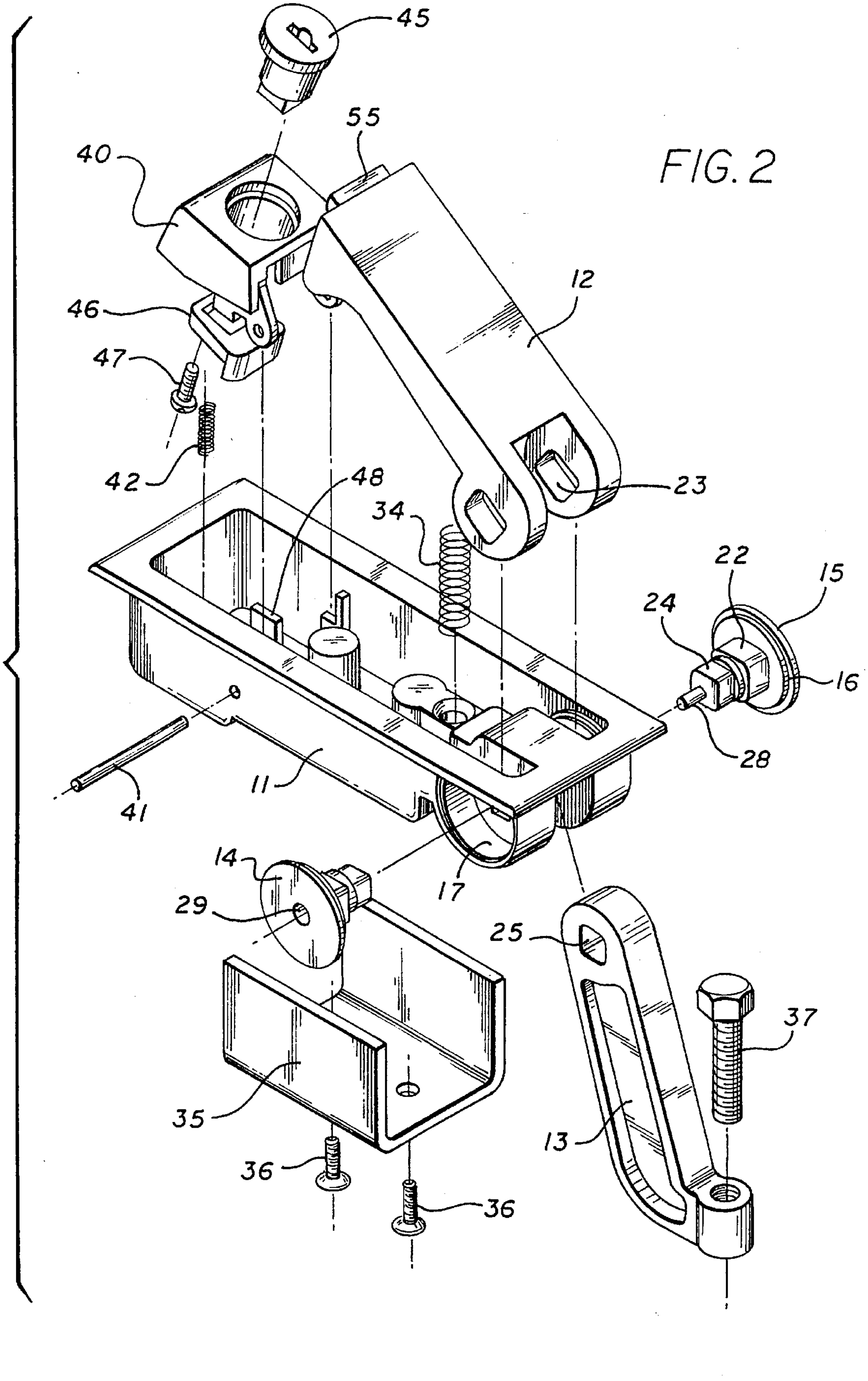
FIG. 2 is an exploded view of the latch of FIG. 1.

The latch as shown in FIG. 2 includes a housing 11 with a handle 12 and a bolt 13 rotatably mounted in the housing. Drive bushings 14, 15 are rotatably mounted in the housing, with the handle 12 and bolt 13 carried on the bushings.

This mounting arrangement is shown in greater detail in FIG. 6. The drive bushings have outer circular sections 16 which rotate in mating circular openings 17 in the housing. The drive bushings also have inner circular sections 18 which rotate in mating circular openings 19 of the housing. Each of the bushings has an outer non-round section 22 for engaging a mating non-round opening 23 in the handle. Each of the drive bushings has an inner non-round section 24 for engaging a mating non-round opening 25 in the bolt.

The drive bushing 15 includes a pin 28 projecting from the inner end, with the pin preferably molded integral with the drive bushing. The drive bushing 14 has an opening 29 therethrough for receiving the pin 28. When the handle 12, bolt 25 and drive bushings 14, 15 are assembled with the drive bushings as shown in FIG. 6, the outer end of the pin 28 is expanded to maintain the drive bushings in abutment in the housing. Preferably, an enlarged opening or counterbore 30 is provided in the drive bushing 14 so that the end of the pin can be expanded within the drive bushing, as shown in FIG. 6. Alternatively, the opening 29 could be of uniform size, with the pin 28 extending to the exterior of the drive bushing 14 where it is anchored in place, as by expanding the end of the pin or installing a lock ring or the like.

Figure 1:
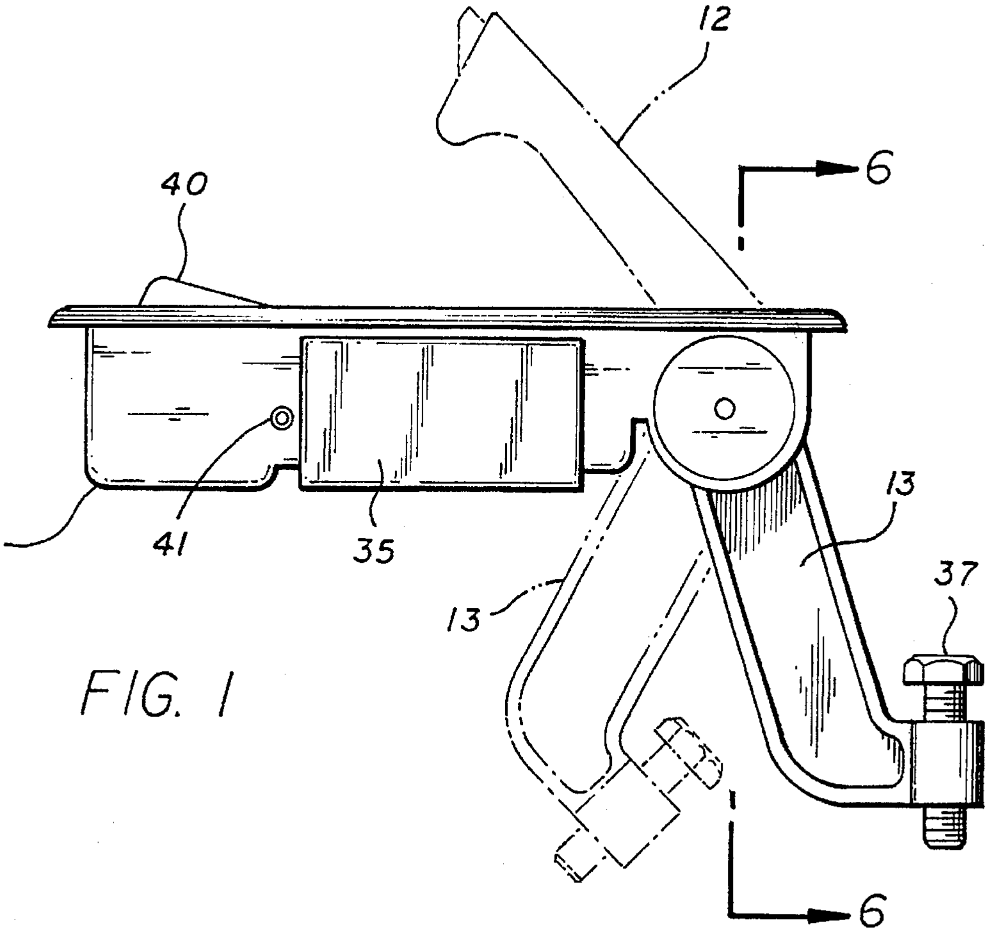
FIG. 1 is a side view of a latch incorporating the presently preferred embodiment of the invention.

In the preferred construction, the housing 11 includes cylindrical bosses 31 and a well 32, and the handle 12 has a boss 33 in alignment with the well 32. A compression spring 34 is positioned in the well 32, with the boss 33 of the handle projecting into the spring. The spring is shown in its compressed state in FIG. 3. When the handle 12 is released, in a manner to be described, the spring urges the handle upward from the position shown in solid lines of FIG. 1 toward the position shown in phantom lines. A mounting bracket 35 is attached to the under side of the housing by screws 36 which are threaded into the bosses 31. The upper edges of the sides of the mounting bracket bear against the inner surface of the door in which the latch is positioned. An adjustment bolt 37 is carried in the outer end of the bolt 13.

A trigger 40 is pivotally mounted in the housing 11 on a shaft 41 which extends into opposite walls of the housing. A spring 42 is positioned in a well 43 in the housing, with a boss 44 of the trigger positioned within the spring. The spring urges the trigger in the clockwise direction toward the position shown in FIG. 3.

If desired, a lock 45 may be rotatably mounted in an opening of the trigger. The lock is conventional in design and is held in place by a cam 46 attached to the lock 45 by a screw 47. The lock and cam are shown in the unlocked position in FIG. 3. A stop 48 projects upward from the bottom of the housing. When the cam 46 of the lock is rotated 90° degrees, it is now positioned above the stop 48 blocking any downward movement of the trigger, thereby maintaining the latch in the locked condition. Other forms of locks, such as a tool actuated lock, may be used, with the tool actuated lock and the key lock being interchangeable. Grooves 58 are provided in the lock opening in the trigger. With the key lock, the lock wafers line up with the grooves. When the key is removed, the spring loaded wafers extend into a groove and prevent lock rotation. For the tool actuated lock, as seen in FIG. 7, a spring 59 and a ball 60 in the lock provide a detent for engaging the grooves 58 to maintain the lock in the locked and the unlocked positions. The lock 45 in FIG. 7 is designed for operation by a tool such as a screw driver, rather than by a key as shown in FIG. 2. Stops 62, 63 on the trigger serve to limit rotation of the lock and cam.

Figure 3:
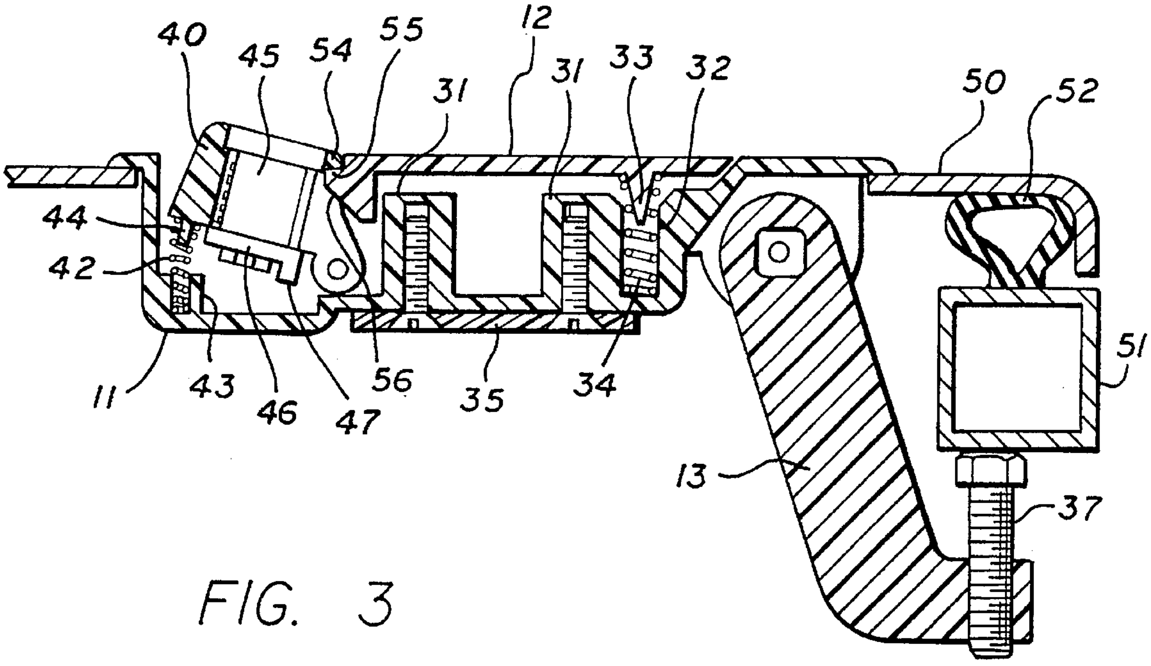
FIG. 3 is a vertical section view through the latch of FIG. 1.

The latch is shown installed in an opening in a door 50 in FIG. 3. The latch is shown in the latch closed position, with the adjustment bolt 37 of the bolt 13 engaging a door frame 51. If desired, a compression gasket 52 may be carried on the frame 51 to provide a seal between the frame and the door.

The latch is moved to the latch open position by pushing downward on the trigger 40. Downward movement of the trigger pivots the trigger portion 54 away from a shoulder 55 of the handle, freeing the handle to pop up due to the spring 34. The operator can then use the handle to open the door. One or more stops 65 may be incorporated in the housing to limit rotation of the trigger after the handle is released.

The latch is closed by closing the door in the frame and then pushing downward on the handle bringing the bolt to the latch closed position of FIG. 3. The outer end of the handle has a tapered surface at 56 which slides downward over the trigger, and the spring 42 moves the trigger to engage the handle and maintain the latch in the latch closed position.

The latch is locked by rotating the lock core to position the stop 47 above the stop 48 thereby preventing any downward movement of the trigger.

The housing has a closed or "bathtub" configuration with the only openings other than at the top, being the aligned openings for the trigger shaft 41 and the aligned openings for the drive bushings 14, 15. These openings are filled by the components so that the structure is essentially dust and moisture tight preventing material exterior to the article being locked from entering the article through the latch. If desired, seals, such as O-ring seals, can be incorporated at the drive bushings to improve the sealing.

The latch may be utilized with a lock mounted in the trigger or with no lock, as the customer desires. The external configuration of the latch is the same for both versions and the opening in the door for receiving the latch is the same.

I claim:

1. A trigger latch for mounting in an opening in a door for releasably latching the door to a door frame, including in combination:

a housing;

a handle;

a bolt; and a shaft rotatably mounted in said housing and non-rotatably mounted in said handle and in said bolt for rotation of said bolt by said handle between a latch closed position and a latch open position, said housing having spaced receptacles with each receptacle having outer and inner walls spaced from each other defining a lever cavity for receiving said handle, and with said inner walls spaced from each other defining a bolt cavity for receiving said bolt, means defining first and second circular openings in each of said outer walls and a third circular opening in each of said inner walls, said shaft comprising first and second drive bushings, each of said drive bushings having first, second and third circular sections for rotational mounting in said first, second and third circular openings, respectively, a first non-circular section fixedly mounted in said handle, and a second non-circular section fixedly mounted in said bolt, each of said drive bushings having an inner end and an outer end with said inner ends in abutment, and with said first drive bushings having a pin projecting from said inner end and said second drive bushing having a passage therethrough for receiving said pin and joining said bushings together.

2. A trigger latch as defined in claim 1 wherein said pin is formed integrally with said first drive bushing.

3. A trigger latch as defined in claim 1 including:

a trigger pivotally mounted in said housing for movement between a handle locking position and a handle unlocking position, said trigger and said handle having interengaging means for maintaining said handle in said latch closed position when said trigger is in said handle locking position;

a spring positioned between said trigger and said housing for urging said trigger into engagement with said handle in said handle locking position; and a lock carried in said trigger and having a rotatable core moveable between a locked condition and an unlocked condition, said housing and said lock core having interengageable members which are engaged when said lock is in said locked condition preventing pivoting of said trigger away from said handle.

4. A trigger latch as defined in claim 3 wherein said interengageable members comprise a stop in said housing projecting upward toward said trigger and a cam on said lock core for abutment with said stop when said lock is in said locked condition.

5. A trigger latch for mounting in an opening in a door for releasably latching the door to a door frame, including in combination:

a housing;

a handle;

a bolt;

a shaft rotatably mounted in said housing and non-rotatably mounted in said handle and in said bolt for rotation of said bolt by said handle between a latch closed position and a latch open position;

a trigger pivotally mounted in said housing separate from said handle for movement between a handle locking position and a handle unlocking position, said trigger and said handle having interengaging means for maintaining said handle in said latch closed position;

a spring positioned between said trigger and said housing for urging said trigger into engagement with said handle when said trigger is in said handle locking position, with pressure on said trigger compressing said spring and pivoting said trigger in said housing in a first direction to disengage said trigger from said handle permitting rotation of said handle and bolt in said housing in a second direction opposite said first direction; and a lock carried in said trigger and having a rotatable core moveable between a locked condition and an unlocked condition, said housing and said lock core having interengageable members which are engaged when said lock is in said locked condition preventing pivoting of said trigger away from said handle.

6. A trigger latch as defined in claim 5 wherein said interengageable members comprise a stop in said housing projecting upward toward said trigger and a cam on said lock core for abutment with said stop when said lock is in said locked condition.

* * * * *